(12) United States Patent
Chien

(10) Patent No.: US 9,902,793 B1
(45) Date of Patent: Feb. 27, 2018

(54) OPHTHALMIC LENS MATERIAL, OPHTHALMIC LENS, AND METHOD FOR MAKING OPHTHALMIC LENS

(71) Applicant: HON HAI PRECISION INDUSTRY CO., LTD., New Taipei (TW)

(72) Inventor: Hsiu-Wen Chien, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/279,437

(22) Filed: Sep. 29, 2016

(30) Foreign Application Priority Data

Aug. 11, 2016 (TW) .............................. 105125638 A

(51) Int. Cl.
| | |
|---|---|
| *C08F 2/46* | (2006.01) |
| *C08F 2/50* | (2006.01) |
| *C08G 61/04* | (2006.01) |
| *C08F 220/28* | (2006.01) |
| *C08K 3/34* | (2006.01) |
| *C08F 220/54* | (2006.01) |
| *G02B 1/04* | (2006.01) |

(52) U.S. Cl.
CPC .......... *C08F 220/28* (2013.01); *C08F 220/54* (2013.01); *C08K 3/346* (2013.01); *G02B 1/043* (2013.01); *C08F 2220/281* (2013.01)

(58) Field of Classification Search
USPC ........... 522/42, 33, 6, 71, 189, 184, 1; 520/1
See application file for complete search history.

(56) References Cited

U.S. PATENT DOCUMENTS

| | | | | |
|---|---|---|---|---|
| 2006/0063852 | A1* | 3/2006 | Iwata ..................... | G02B 1/043 523/106 |
| 2009/0234089 | A1* | 9/2009 | Ueyama ................... | C08F 8/42 526/279 |
| 2014/0268028 | A1* | 9/2014 | Vanderlaan ............ | G02B 1/043 351/159.33 |
| 2016/0282517 | A1* | 9/2016 | Naik ...................... | G02B 1/043 |

* cited by examiner

*Primary Examiner* — Jessica Whiteley
(74) *Attorney, Agent, or Firm* — ScienBiziP, P.C.

(57) ABSTRACT

A method for making an ophthalmic lens includes following steps of providing a mixture comprising a hydrophilic monomer, a clay, a cross-linking agent, an initiator, and a solvent; and feeding the mixture into a mold and exposing the mixture to ultraviolet radiation or heating the mixture, to cause the hydrophilic monomer, the cross-linking agent, and the initiator in the mixture to undergo a polymerization reaction to form a cross-linking network, and the clay in the mixture to be dispersed in the cross-linking network, thereby forming the ophthalmic lens. The disclosure also provides an ophthalmic lens made by above method, and an ophthalmic lens material making for the ophthalmic lens.

4 Claims, 1 Drawing Sheet

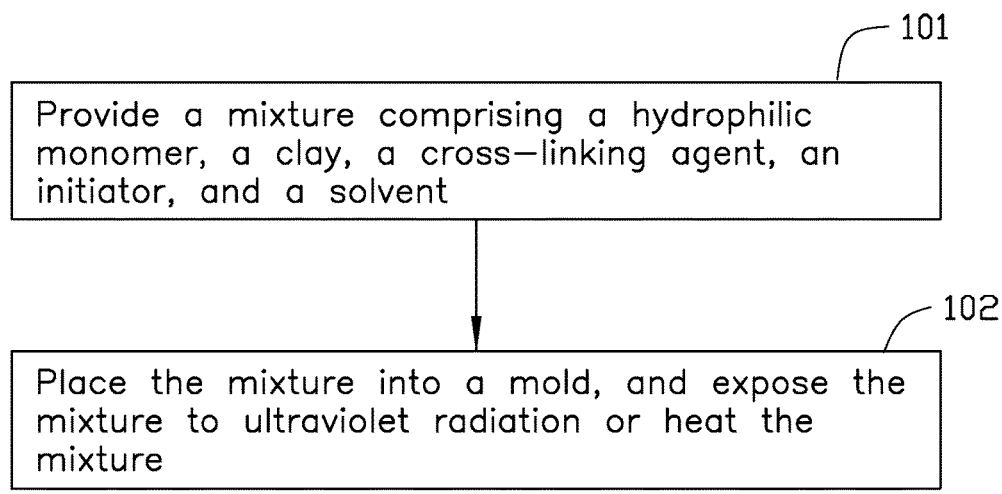

OPHTHALMIC LENS MATERIAL, OPHTHALMIC LENS, AND METHOD FOR MAKING OPHTHALMIC LENS

FIELD

The subject matter herein generally relates to an ophthalmic lens material, an ophthalmic lens, and method for making the ophthalmic lens.

BACKGROUND

Contact lenses are commonly worn by users to correct vision, or for cosmetic or therapeutic reasons. Since the contact lens directly contacts with eyes of the user when in use, good mechanical properties of the contact lens are needed.

BRIEF DESCRIPTION OF THE DRAWINGS

Implementations of the present technology will now be described, by way of example only, with reference to the attached FIGURE.

The FIGURE is a flowchart of an exemplary embodiment of a method for making an ophthalmic lens.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

The FIGURE illustrates a flowchart of a method for making an ophthalmic lens in accordance with an exemplary embodiment. The exemplary method is provided by way of example, as there are a variety of ways to carry out the method. Each block shown in the FIGURE represents one or more processes, methods, or subroutines, carried out in the exemplary method. Furthermore, the illustrated order of blocks is by example only and the order of the blocks can change. Additional blocks may be added or fewer blocks may be utilized, without departing from this disclosure. The exemplary method can begin at block 101.

At block 101, a mixture comprising a hydrophilic monomer, a clay, a cross-linking agent, an initiator, and a solvent is provided. The hydrophilic monomer has a mass percentage of about 40% to about 65% of a total mass of the mixture. The clay has a mass percentage of about 0.1% to about 3% of the total mass of the mixture. The cross-linking agent has a mass percentage of about 0.15% to about 2% of the total mass of the mixture. The initiator has a mass percentage of about 0.11% to about 1.05% of the total mass of the mixture. The solvent has a mass percentage of about 30% to about 58% of the total mass of the mixture.

The hydrophilic monomer may be selected from a group consisting of methacryloxyalkyl siloxanes, 3-methacryloxypropylpentamethyldisiloxane, bis(methacryloxypropyl)tetramethyl-disiloxane, monomethacrylatedpolydimethylsiloxane, mercapto-terminatedpolydimethylsiloxane, N-[tris(trimethylsiloxy)silylpropyl]acrylamide, N-[tris(trimethylsiloxy)silylpropyl]methacrylamide, tris(pentamethyldisiloxyanyl)-3-methacrylatopropylsilane (T2), 3-methacryloxypropyletris(trimethylsiloxy)silane, 2-hydroxyethylmethacrylate (HEMA), hydroxyethyl acrylate, hydroxypropyl acrylate, hydroxypropyl methacrylate (HPMA), trimethylammonium 2-hydroxy propylmethacrylate hydrochloride, dimethylaminoethyl methacrylate (DMAEMA), dimethylaminoethylmethacrylamide, acrylamide, methacrylamide, allyl alcohol, vinylpyridine, glycerol methacrylate, N-(1,1dimethyl-3-oxobutyl)acrylamide, N-vinyl-2-pyrrolidone (NVP), acrylic acid, methacrylic acid, and N,N-dimethyacrylamide (DMA).

In at least one exemplary embodiment, the clay comprises aluminium silicate as a main composition. The clay may be selected from a group consisting of kaolinite, dickite, halloysite, nacrite, montmorillonite, pyrophyillite, talc, vermiculite, nontronite, and saponite, illite, chlorite, sepiolite, zeolite, attapulgite, and synthetic clay (such as laponite). The clay is lamellar. The clay has a length of about 1 nm to about 40 nm, and has a thickness of about 0.1 nm to about 100 nm. In at least one exemplary embodiment, the clay is a lamellar montmorillonite. The lamellar montmorillonite has length of about 23 nm to about 27 nm, and has a thickness of about 1 nm.

The cross-linking agent may be selected from a group consisting of ethylene glycol dimethacrylate (EGDMA), trimethylolpropane trimethacrylate (TMPTMA), tri(ethylene glycol) dimethacrylate (TEGDMA), tri(ethylene glycol) divinyl ether (TEGDVE), and trimethylene glycol dimethacrylate.

The initiator may be a photoinitiator or a thermal initiator. The photoinitiator may be selected from a group consisting of benzoin methyl ether, diethoxyacetophenone, a benzoylphosphine oxide initiator, 1-hydroxycyclohexyl phenyl ketone, Darocure type initiator and Irgacure type initiator. In at least one exemplary embodiment, the photoinitiator is selected from Darocure-1173, Darocure-2959 or Irgacure-1173. The benzoylphosphine oxide initiator may be selected from a group consisting of 2,4,6-trimethylbenzoyldiphenylphosphine oxide, bis-(2,6-dichlorobenzoyl)-4-N-propylphenylphosphine oxide, and bis-(2,6-dichlorobenzoyl)-4-N-butylphenylphosphine oxide. The thermal initiator may be selected from a group consisting of 2,2'-azobis (2,4-dimethylpentanenitrile), 2,2'-azobis (2-methylpropanenitrile), 2,2'-azobis (2-methylbutanenitrile), azobisisobutyronite (AIBN), and peroxides such as benzoyl peroxide.

The solvent may be water or a mixed solution comprising water and organic solvent. When the solvent is the mixed solution, the organic solvent has a mass percentage of about 1% to about 10% of a total mass of the mixed solution. The organic solvent may be selected from a group consisting of tetrahydrofuran, tripropylene glycol methyl ether, dipropylene glycol methyl ether, ethylene glycol n-butyl ether, diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3, 4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethylformamide, dimethyl acetamide, dimethyl propionamide, and N-methyl pyrrolidinone.

At block 102, the mixture is placed into a mold and is exposed to ultraviolet radiation or is heated, to cause the hydrophilic monomer, the cross-linking agent, and the initiator in the mixture to undergo a polymerization reaction to form a cross-linking network. The clay in the mixture is dispersed in the cross-linking network, thereby forming the ophthalmic lens. A time period for the ultraviolet irradiation or heating is from about 5 min to about 120 min. The clay is dispersed in the cross-linking network, to cause the clay to be uniformly dispersed in the ophthalmic lens, and prevent the clay from being released from the ophthalmic lens. Furthermore, since the clay is uniformly dispersed in the ophthalmic lens, the ophthalmic lens retains a good transparency. The clay in the ophthalmic lens improves an oxygen permeability and mechanical properties such as tensile strength, resistance to compression, flexibility, and torsional resistance.

In another exemplary embodiment, the mixture may further comprise an antimicrobial agent such as silver nanoparticles, to cause the ophthalmic lens to have antibacterial properties.

In at least one exemplary embodiment, the mixture may further comprise a bioactive agent. The bioactive agent may be selected from a group consisting of a drug, an amino acid (such as taurine and glycine), a polypeptide, a protein, a nucleic acid, and 2-pyrrolidone-5-carboxylic acid (PCA), alpha hydroxyl acids (such as glycolic, lactic, malic, tartaric, mandelic, citric acids and salts thereof), linoleic acids, gamma linoleic acids, and vitamins (such as vitamin B5, vitamin A, and vitamin B6). The drug may be selected from a group consisting of rebamipide, ketotifen, olaptidine, cromoglycolate, cyclosporine, nedocromil, levocabastine, lodoxamide, and the pharmaceutically acceptable salts or esters thereof. The bioactive agent can prevent or relieve eye diseases.

Example 1

A mixture was formed by mixing 2-hydroxyethylmethacrylate, laponite, ethylene glycol dimethacrylate, Irgacure-1173, and water. The 2-hydroxyethylmethacrylate had a mass percentage of 61.90% of a total mass of the mixture. The laponite had a mass percentage of 1.10% of a total mass of the mixture. The ethylene glycol dimethacrylate had a mass percentage of 1.30% of a total mass of the mixture. The Irgacure-1173 had a mass percentage of 0.45% of a total mass of the mixture. The water had a mass percentage of 32.25% of a total mass of the mixture. The mixture was fed into a mold and was exposed to ultraviolet radiation for 10 mins, thereby forming an ophthalmic lens.

Example 2

A mixture was formed by mixing 2-hydroxyethylmethacrylate, laponite, ethylene glycol dimethacrylate, Irgacure-1173, and water. The 2-hydroxyethylmethacrylate had a mass percentage of 58.20% of a total mass of the mixture. The laponite had a mass percentage of 0.11% of a total mass of the mixture. The ethylene glycol dimethacrylate had a mass percentage of 0.62% of a total mass of the mixture. The Irgacure-1173 had a mass percentage of 0.35% of a total mass of the mixture. The water had a mass percentage of 36.03% of a total mass of the mixture. The mixture was fed into a mold and was exposed to ultraviolet radiation for 10 mins, thereby forming an ophthalmic lens.

Example 3

A mixture was formed by mixing 2-hydroxyethylmethacrylate, N,N-dimethyacrylamide, laponite, ethylene glycol dimethacrylate, Irgacure-1173, and water. The 2-hydroxyethylmethacrylate had a mass percentage of 49.60% of a total mass of the mixture. The N,N-dimethyacrylamide had a mass percentage of 9.93% of a total mass of the mixture. The laponite had a mass percentage of 1.20% of a total mass of the mixture. The ethylene glycol dimethacrylate had a mass percentage of 0.40% of a total mass of the mixture. The Irgacure-1173 had a mass percentage of 0.30% of a total mass of the mixture. The water had a mass percentage of 38.56% of a total mass of the mixture. The mixture was fed into a mold and was exposed to ultraviolet radiation for 10 mins, thereby forming an ophthalmic lens.

Example 4

A mixture was formed by mixing 2-hydroxyethylmethacrylate, N,N-dimethyacrylamide, laponite, ethylene glycol dimethacrylate, azobisisobutyronite, and water. The 2-hydroxyethylmethacrylate had a mass percentage of 28.80% of a total mass of the mixture. The N,N-dimethyacrylamide had a mass percentage of 30.80% of a total mass of the mixture. The laponite had a mass percentage of 1.20% of a total mass of the mixture. The ethylene glycol dimethacrylate had a mass percentage of 1.03% of a total mass of the mixture. The azobisisobutyronite had a mass percentage of 1.03% of a total mass of the mixture. The water had a mass percentage of 38.56% of a total mass of the mixture. The mixture was fed into a mold and was heated for 75 mins at 75 degrees Celsius, thereby forming an ophthalmic lens.

Example 5

A mixture was formed by mixing 2-hydroxyethylmethacrylate, N,N-dimethyacrylamide, montmorillonite, ethylene glycol dimethacrylate, azobisisobutyronite, and alcohol. The 2-hydroxyethylmethacrylate had a mass percentage of 32.40% of a total mass of the mixture. The N,N-dimethyacrylamide had a mass percentage of 28.50% of a total mass of the mixture. The montmorillonite had a mass percentage of 0.76% of a total mass of the mixture. The ethylene glycol dimethacrylate had a mass percentage of 0.87% of a total mass of the mixture. The azobisisobutyronite had a mass percentage of 1.00% of a total mass of the mixture. The alcohol had a mass percentage of 10.00% of a total mass of the mixture. The mixture was fed into a mold and was heated for 90 mins at 75 degrees Celsius, thereby forming an ophthalmic lens.

An ophthalmic lens material used in the above method to make the ophthalmic lens is provided. The ophthalmic lens material comprises a hydrophilic monomer, a clay, a cross-linking agent, an initiator, and a solvent. The hydrophilic monomer has a mass percentage of about 40% to about 65% of a total mass of the ophthalmic lens material. The clay has a mass percentage of about 0.1% to about 3% of the total mass of the ophthalmic lens material. The cross-linking agent has a mass percentage of about 0.15% to about 2% of the total mass of the ophthalmic lens material. The initiator has a mass percentage of about 0.11% to about 1.05% of the total mass of the ophthalmic lens material. The solvent has a mass percentage of about 30% to about 58% of the total mass of the ophthalmic lens material. When the ophthalmic lens material is exposed to ultraviolet radiation or is heated, the hydrophilic monomer, the cross-linking agent, and the initiator undergo a polymerization reaction to form a cross-linking network. The clay in the mixture is dispersed in the cross-linking network, thereby forming the ophthalmic lens.

An ophthalmic lens made by the method is provided. The ophthalmic lens is formed by exposing a mixture of the hydrophilic monomer, the clay, the cross-linking agent, the initiator, and the solvent to ultraviolet radiation or heating the mixture. This causes the hydrophilic monomer, the cross-linking agent, and the initiator to undergo a polymerization reaction to form a cross-linking network, and the clay in the mixture to be dispersed in the cross-linking network. The ophthalmic lens can be a contact lens or an intraocular lens. The hydrophilic monomer has a mass percentage of about 40% to about 65% of a total mass of the mixture. The clay has a mass percentage of about 0.1% to about 3% of the total mass of the mixture. The cross-linking agent has a mass percentage of about 0.15% to about 2% of the total mass of the mixture. The initiator has a mass percentage of about 0.11% to about 1.05% of the total mass of the mixture.

It is to be understood that, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A method for making an ophthalmic lens comprising:
   providing a mixture comprising a hydrophilic monomer, a clay, a cross-linking agent, an initiator, and a solvent; and
   placing the mixture into a mold, and exposing the mixture to ultraviolet radiation or heating the mixture, to cause the hydrophilic monomer, the cross-linking agent, and the initiator in the mixture to undergo a polymerization reaction to form a cross-linking network, and the clay in the mixture to be dispersed in the cross-linking network, thereby forming the ophthalmic lens;
   wherein the hydrophilic monomer has a mass percentage of about 40% to about 65% of a total mass of the mixture, the clay has a mass percentage of about 0.1% to about 3% of the total mass of the mixture, the cross-linking agent has a mass percentage of about 0.15% to about 2% of the total mass of the mixture, the initiator has a mass percentage of about 0.11% to about 1.05% of the total mass of the mixture, the solvent has a mass percentage of about 30% to about 58% of the total mass of the mixture.

2. The method of claim 1, wherein the clay comprises aluminium silicate.

3. The method of claim 2, wherein the clay is selected from a group consisting of kaolinite, dickite, halloysite, nacrite, montmorillonite, pyrophyillite, talc, vermiculite, nontronite, saponite, illite, chlorite, sepiolite, zeolite, attapulgite, and synthetic clay.

4. The method of claim 1, wherein the solvent is water or a mixed solution comprising water and organic solvent, the organic solvent has a mass percentage of about 1% to about 10% of a total mass of the mixed solution.

* * * * *